United States Patent
Ohara (10) Patent No.: US 10,643,219 B2
(45) Date of Patent: May 5, 2020

(54) NON-TRANSITORY COMPUTER-READABLE MEDIUM FOR SERVER CAPABLE OF EXECUTING TARGET SERVICE RELATED TO COMMUNICATION DEVICE

(71) Applicant: Brother Kogyo Kabushiki Kaisha, Nagoya-shi, Aichi-ken (JP)

(72) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 296 days.

(21) Appl. No.: 15/444,614

(22) Filed: Feb. 28, 2017

(65) Prior Publication Data

US 2017/0249641 A1    Aug. 31, 2017

(30) Foreign Application Priority Data

Feb. 29, 2016 (JP) .................................. 2016-037524

(51) Int. Cl.
*G06F 15/173* (2006.01)
*G06Q 30/00* (2012.01)
(Continued)

(52) U.S. Cl.
CPC ......... *G06Q 30/012* (2013.01); *G06F 3/1204* (2013.01); *G06F 3/1235* (2013.01); *G06F 3/1285* (2013.01); *H04L 67/141* (2013.01)

(58) Field of Classification Search
CPC ... G06Q 30/012; G06F 3/1204; G06F 3/1235; G06F 3/1285; H04L 67/141
(Continued)

(56) References Cited

U.S. PATENT DOCUMENTS 6,310,692 B1    10/2001 Fan et al.
8,867,070 B2 *  10/2014 Jazayeri ................ G06F 3/1204
                                                          358/1.14
(Continued)

FOREIGN PATENT DOCUMENTS

JP    2010-034853 A    2/2010
JP    2013-186833 A    9/2013
(Continued)

OTHER PUBLICATIONS

Aug. 1, 2017—(EP) Search Report—App 17157693.7.
Jul. 30, 2019—(JP) Notification of Reason for Rejection—App 2016-037524.

*Primary Examiner* — Liang Che A Wang
*Assistant Examiner* — Kaylee J Huang
(74) *Attorney, Agent, or Firm* — Banner & Witcoff, Ltd.

(57) ABSTRACT

A server may receive a first registration request including a first code from the communication device, the first code having been stored in advance in the communication device, if a second code is inputted into a terminal device, receive a second registration request including the second code from the terminal device, if one of the first and second registration requests is received, register target information including one code included in the one of the first and second registration requests in a memory such that a state of the target information is to be a first state where the server does not perform a target service, and if the other code in other one of the above registration requests matches the one code in the target information, change the state of the target information from the first state to a second state where the server performs the target service.

15 Claims, 7 Drawing Sheets

(51) Int. Cl.
*G06F 3/12* (2006.01)
*H04L 29/08* (2006.01)

(58) Field of Classification Search
USPC ............................... 709/225, 222, 223, 219
See application file for complete search history.

(56) References Cited

U.S. PATENT DOCUMENTS

| | | | |
|---|---|---|---|
| 9,348,544 B2 | 5/2016 | Jeran et al. | |
| 9,619,186 B2 | 4/2017 | Webb et al. | |
| 2005/0141024 A1* | 6/2005 | Yoshihara | G06F 3/122 |
| | | | 358/1.15 |
| 2006/0192997 A1* | 8/2006 | Matsumoto | G06F 3/1204 |
| | | | 358/1.15 |
| 2011/0125891 A1 | 5/2011 | Kawai | |
| 2011/0252085 A1* | 10/2011 | Mase | H04N 5/44543 |
| | | | 709/203 |
| 2012/0194864 A1* | 8/2012 | Oshima | G06F 3/1204 |
| | | | 358/1.15 |
| 2012/0254961 A1* | 10/2012 | Kim | H04L 12/66 |
| | | | 726/7 |
| 2013/0135669 A1* | 5/2013 | Ide | G06K 15/02 |
| | | | 358/1.15 |
| 2013/0222839 A1* | 8/2013 | Armstrong | G06F 3/1203 |
| | | | 358/1.14 |
| 2014/0160519 A1 | 6/2014 | Jeran et al. | |
| 2015/0092233 A1* | 4/2015 | Park | G06F 3/1288 |
| | | | 358/1.15 |
| 2015/0370515 A1 | 12/2015 | Webb et al. | |
| 2016/0112260 A1* | 4/2016 | Pai | H04L 67/141 |
| | | | 709/222 |
| 2016/0224947 A1* | 8/2016 | Ishimaru | G06Q 10/20 |
| 2016/0316100 A1* | 10/2016 | Hwang | G06F 3/1222 |
| 2017/0337542 A1* | 11/2017 | Kim | G06F 3/041 |

FOREIGN PATENT DOCUMENTS

| | | |
|---|---|---|
| WO | 2013/019186 A1 | 2/2013 |
| WO | 2014/120229 A1 | 8/2014 |

* cited by examiner

FIG. 5 (First Embodiment: Case A)

(First Embodiment: Case C)

NON-TRANSITORY COMPUTER-READABLE MEDIUM FOR SERVER CAPABLE OF EXECUTING TARGET SERVICE RELATED TO COMMUNICATION DEVICE

TECHNICAL FIELD

The disclosure herein discloses a technique relating to a non-transitory computer-readable medium for realizing a server which is capable of executing a target service related to a communication device.

DESCRIPTION OF RELATED ART

A technique is known in which an interim registration of information for identifying an air conditioner is performed in a remote management server, and thereafter a final registration of the information is performed in the remote management server. Specifically, in a case of receiving, from an adapter for connecting the air conditioner to a LAN (abbreviation of Local Area Network), a MAC address for identifying the adapter and a keyword that is set in the adapter by a serviceman of the air conditioner, the remote management server stores the MAC address and the keyword in an interim state. Afterwards, in a case where a keyword is entered by the serviceman to a terminal device which is different from the air conditioner, the remote management server receives the keyword from the terminal device. Then, in a case where the stored keyword and the received keyword match each other, the remote management server stores the MAC address in a final registration state.

SUMMARY

In the aforementioned technique, the serviceman needs to set the keyword in the adapter to perform the final registration of the MAC address.

The present application provides a technique that reduces user's workload for registering target information including identification information of a communication device in a server.

A non-transitory computer-readable medium storing computer-readable instructions for a server, the computer-readable instructions, when executed by a processor of the server, may cause the server to execute: receiving a first registration request including identification information for identifying a communication device and a first code from the communication device via the Internet, the first code having been stored in advance in the communication device without being inputted to the communication device by a user of the communication device; in a case where a second code is inputted to a terminal device different from the communication device by the user, receiving a second registration request including the second code from the terminal device via the Internet; in a case where one of the first and second registration requests is received, registering target information including one code included in the one of the first and second registration requests in a memory such that a registration state of the target information is to be a first registration state the first registration state being a state where the server does not perform a target service which is related to the communication device; in a case where the other one of the first and second registration requests is received after the target information has been registered in the memory, determining whether the other code included in the other one of the first and second registration requests matches the one code included in the target information; in a case where it is determined that the other code matches the one code, changing the registration state of the target information from the first registration state to a second registration state, the second registration state being a state where the server performs the target service which is related to the communication device identified by the identification information included in the target information, wherein in a case where it is determined that the other code does not match the one code, the registration state of the target information is not changed from the first registration state to the second registration state; and in a case where the registration state of the target information is changed to the second registration state, performing the target service which is related to the communication device identified by the identification information included in the target information.

The server itself that is realized by the non-transitory computer-readable medium, and a control method of the server are also novel and useful.

EMBODIMENTS

Figure 1:
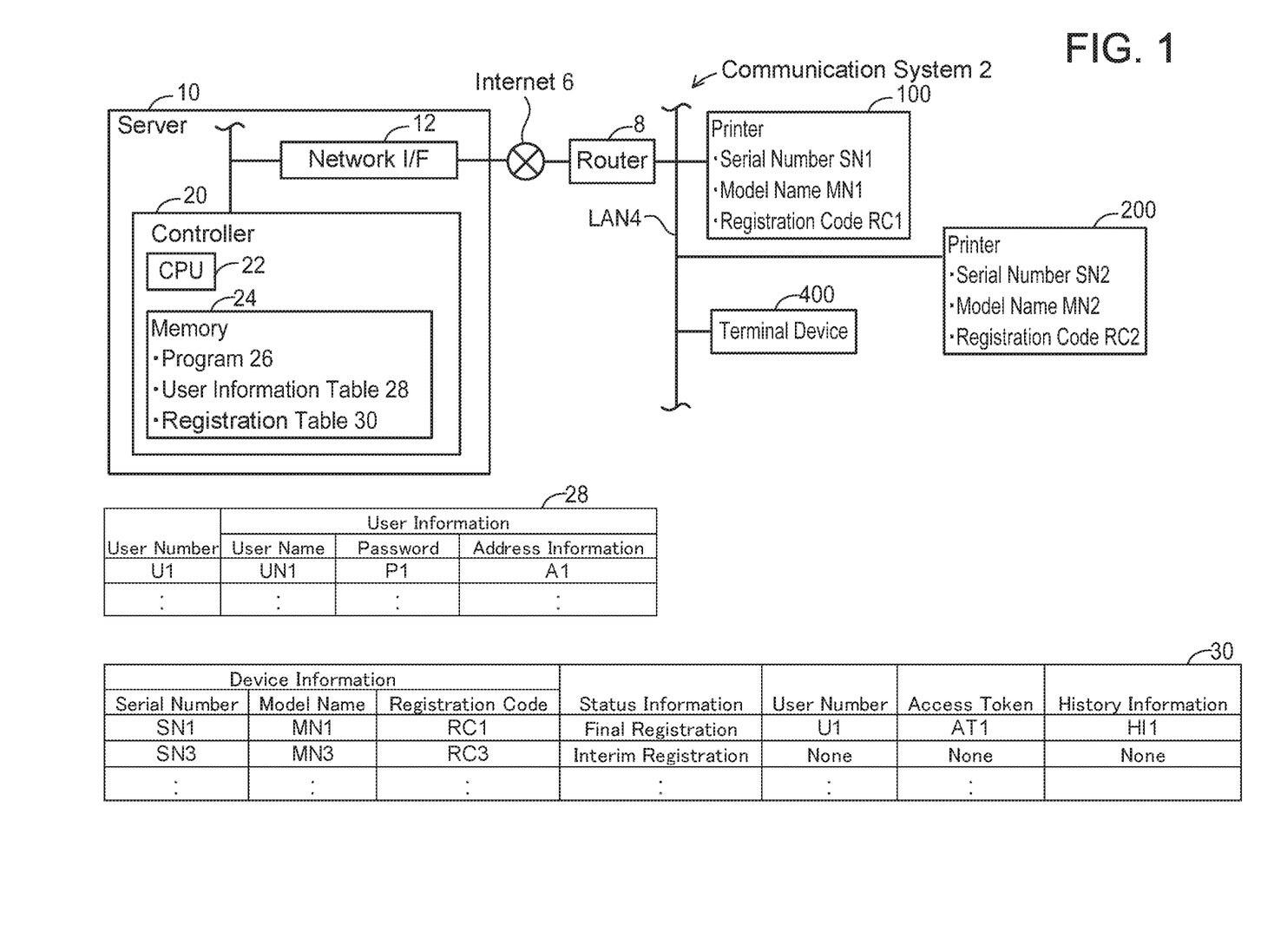
FIG. 1 show a configuration of a communication system and configurations of tables.

First Embodiment (Configuration of a Communication System 2; FIG. 1)
Referring to FIG. 1, a configuration of a communication system 2 will be described. The communication system 2 comprises a server 10, printers 100 and 200, and a terminal device 400. The devices 100, 200, and 400 can communicate with one another via a LAN (abbreviation of Local Area Network) 4. The LAN 4 is connected to the Internet 6 via a router 8. The LAN 4 may be a wired LAN or a wireless LAN. The server 10 can communicate with each of the devices 100, 200, and 400 via the Internet 6.

(Configurations of the Printers 100 and 200)
The printer 100 is a peripheral device (i.e., a peripheral device of the terminal device 400) comprising a color printing function. A serial number SN1, a model name MN1, and a registration code RC1 are assigned to the printer 100. When a vender of the printer 100 manufactures plural printers of the same model (i.e., the model name MN1), the vender determines a plurality of character strings including consecutive numbers as a plurality of serial numbers. Here, each of the serial numbers may further include alphabetical letter(s) and/or mark(s) (e.g., hyphen, etc.). The vender further determines a plurality of character strings which are randomly set as a plurality of registration codes. At this occasion, the vender determines the plurality of registration codes such that the registration codes do not duplicate with one another. Thus, each of the serial numbers and the registration codes is a unique character string. Notably, compared to the serial numbers, the registration codes are character strings relatively easier for a user to input (e.g., character strings constituted only of numbers). Further, a number of letters constituting each registration code is less than a number of letters constituting each serial number. The registration codes are used to register various pieces of information including the serial numbers in the server 10.

The vender assigns the serial number SN1 and the registration code RC1 to the printer 100 among the plural printers. The respective pieces of information SN1, MN1, and RC1 are stored in the printer 100, when the printer 100 is manufactured. That is, the respective pieces of the information SN1, MN1, and RC1 are stored in advance in the printer 100 by the time when the printer 100 is shipped. In other words, the respective pieces of information SN1, MN1, and RC1 are stored in advance in the printer 100 without being inputted by the user of the printer 100 into the printer 100. Notably, the serial number, the model name, and the registration code may be collectively termed "device information" below.

Further, a sheet on which the registration code RC1 is described is shipped together with the printer 100. For example, the sheet may be a sticker affixed on a surface of the printer 100, or an operating manual of the printer 100. Thereby, the user of the printer 100 is able to know the registration code RC1 by checking the sheet. Notably, in a variation, in a case where the printer 100 receives a predetermined operation, the printer 100 may print the sheet on which the registration code RC1 is described. Further, in another variation, a terminal device (e.g., the terminal device 400) connected to the LAN 4 may request the registration code RC1 to the printer 100, receive the registration code RC1 from the printer 100, and display the received registration code RC1. In the this variant especially, the printer 100 may function as a web server, and the terminal device 400 may access the web server in the printer 100 by using a browser program and receive the registration code RC1 from the printer 100. In both of the variations, the user is able to know the registration code RC1.

The printer 200 is a printer of a model different from the model of the printer 100 and stores a serial number SN2, a model name MN2, and a registration code RC2 in advance. Further, a sheet on which the registration code RC2 is described is shipped together with the printer 200.

(Configuration of the Server 10)

The server 10 is a server for providing a target service (e.g., shipping ink and sending an email to be described later) related to each of the printers 100 and 200 to users of the printers 100, 200 and the like. The server 10 is set up on the Internet 6 by the vender of the printer 100. Notably, in a variation, the server 10 may be set up on the Internet 6 by a business entity different from the vender.

The server 10 comprises a network interface 12 and a controller 20. Each of the network interface 12 and the controller 20 is connected to a bus line (not shown). Notably, the interface will be described as "I/F" below. The controller 20 comprises a CPU 22 and a memory 24. The CPU 22 executes various processes in accordance with a program 26 stored in the memory 24. The memory 24 is constituted of a volatile memory, a non-volatile memory, and the like. The memory 24 stores, other than the program 26, a user information table 28 and a registration table 30. Notably, in a variation, the user information table 28 and the registration table 30 may be stored in an external memory that is communicably connected to the server 10.

(Configuration of the User Information Table 28; FIG. 1)

Referring to FIG. 1, a configuration of the user information table 28 will be described. One or more pieces of user information are registered in the user information table 28. Each of the user information includes a user name (e.g., "UN1") for identifying a corresponding user, a password (e.g., "P1"), and address information (e.g., "A1"). Each of the address information includes an email address and a street address of its corresponding user. Each of the user information is associated with a unique user number for identifying the user information.

(Configuration of the Registration Table 30; FIG. 1)

Referring to FIG. 1, a configuration of the registration table 30 will be described. One or more pieces of device information are registered in the registration table 30. Each device information includes a serial number (e.g., "SN1"), a model name (e.g., "MN1"), and a registration code (e.g., "RC1"). Each of the device information is associated with status information, a user number, an access token, and history information. Notably, in a variation, each of the device information may not include a model name.

Each of the status information indicates a registration state of the associated device information. The registration state indicates an interim registration state or a final registration state. In the interim registration state, the user number, the access token, and the history information are not associated with the device information (e.g., see device information including "SN3"). In the interim registration state, the server 10 does not execute a target service related to a printer identified by the serial number included in the device information. On the other hand, in the final registration state, the user number, the access token, and the history information are associated with the device information (e.g., see device information including "SN1"). In the state where the user number is associated with the device information (i.e., in the final registration state), the device information (e.g., device information including "SN1") and user information identified by the user number (e.g., user information including "UN1") are associated with each other via the user number (e.g., "U1"). In the final registration state, the server 10 executes the target service related to the printer identified by the serial number included in the device information.

The access token is information for establishing various connections via the Internet 6 between the server 10 and the printer. The connections include, for example, an XMPP (abbreviation of Extensible Messaging and Presence Protocol) connection, an HTTPS (abbreviation of Hypertext Transfer Protocol Secure) connection, and the like. Notably, the XMPP connection is a so-called constant connection, which continues to be established until power of the printer 100 is turned off. By using the XMPP connection, the server 10 can send a request to the printer passing through a firewall of the LAN which the printer belongs to (e.g., a firewall formed by the router 8) without receiving a request from the printer. Notably, the mechanism that sends the request from the server 10 to the printer may not be the XMPP connection but may be another method.

The history information is information indicating a history of remaining amount information of the printer. The remaining amount information is information indicating remaining amounts of respective colors of ink (e.g., CMYK) in the printer.

Figure 2:
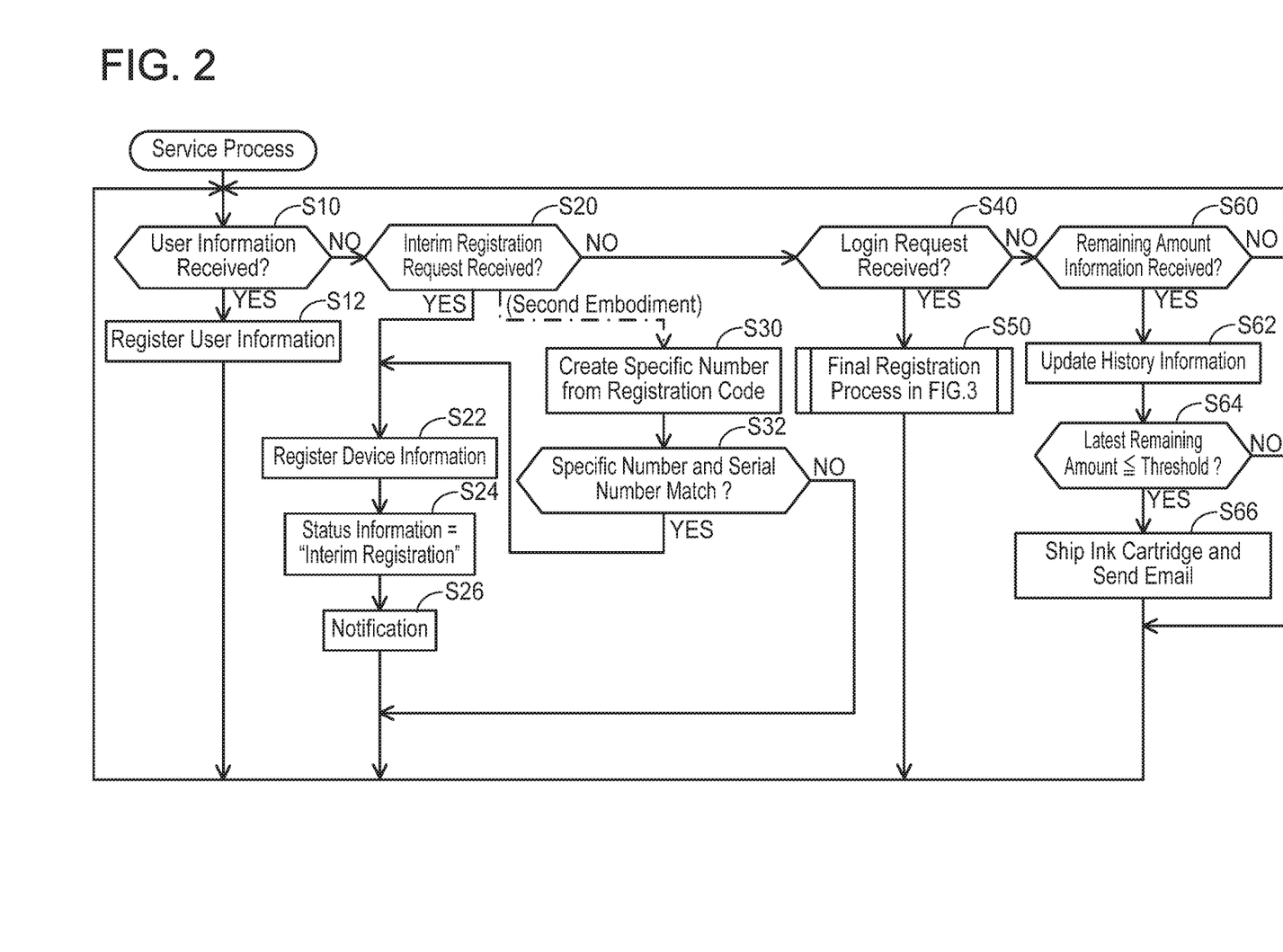
FIG. 2 shows a flowchart of a service process.

(Service Process: FIG. 2)

Referring to FIG. 2, a service process which the CPU 22 of the server 10 executes in accordance with the program 26 will be described. The service process is triggered by the power of the server 10 being turned on. In the service process, each monitoring step S10, S20, S40, and S60 is executed sequentially.

In S10, the CPU 22 monitors receiving user information from the terminal device (e.g., the terminal device 400) via the Internet 6. In a case of receiving the user information together with a request for registering a new user, the CPU 22 determines YES in S10 and proceeds to S12.

In S12, the CPU 22 creates a new user number, and registers the user number and the received user information in association with each other in the user information table 28. When S12 ends, the CPU 22 returns to S10.

In S20, the CPU 22 monitors receiving an interim registration request from the printer (e.g., the printer 200) via the Internet 6. The interim registration request is a request including device information of the printer, and is for registering the device information in the registration table 30. In a case of receiving the interim registration request, the CPU 22 determines YES in S20 and proceeds to S22.

Notably, the printer sends the interim registration request to the server 10 when both conditions of the printer being connected to the Internet via the LAN 4 and the router 8, and electrical power being supplied to the printer are fulfilled. That is, the printer sends the interim registration request to the server 10, for example, upon when the power of the printer is turned on while a LAN cable is connected thereto. Further, the printer sends the interim registration request to the server 10 upon when the LAN cable is connected to the printer while the power of the printer is turned on. Since the user does not need to perform a particular operation for sending the interim registration request at the printer, workload of the user can be reduced. Notably, in a variation, the printer may send the interim registration request to the server 10 in a case of accepting a predetermined operation performed by the user. Notably, in a variation, the printer may send the interim registration request to the server 10 upon when a setting of a wireless LAN for the printer is completed (i.e., upon when the printer is connected to the wireless LAN) while the power of the printer is turned on.

In S22, the CPU 22 registers the device information included in the received interim registration request in the registration table 30. Then, in S24, the CPU 22 associates the device information registered in S22 with the status information indicating the interim registration status. In S26, the CPU 22 sends a notification which indicates that the interim registration of the device information has been completed to the printer from which the interim registration request was sent in S20. Due to this, the CPU 22 can have the printer display a screen indicating that the interim registration has been completed. When S26 ends, the CPU 22 returns to S10. Notably, in a case where device information that matches the device information included in the received interim registration request is already registered in the registration table 30, the CPU 22 does not register the received device information in the registration table 30.

In S40, the CPU 22 monitors receiving a login request from the terminal device (e.g., the terminal device 400) via the Internet 6. The login request is a request for logging in the server 10. In a case of receiving the login request, the CPU 22 determines YES in S40 and proceeds to S50. In S50, a final registration process (see FIG. 3) is executed. When the final registration process in S50 ends, the CPU 22 returns to S10.

In S60, the CPU 22 monitors receiving the remaining amount information from the printer (e.g., the printer 200) via the Internet 6. In a case of receiving the remaining amount information, the CPU 22 determines YES in S60 and proceeds to S62. In S62, the CPU 22 updates the history information which is associated with the device information including the serial number of the printer received together with the remaining amount information by adding the remaining amount information to the history information.

Next, in S64, the CPU 22 determines whether or not at least one of remaining amounts of four colors of ink included in the latest remaining amount information of the updated history information is equal to or less than a threshold (e.g., 10%). In a case of determining that all of the remaining amounts of the four colors of ink are larger than the threshold (NO in S64), the CPU 22 skips S66 and returns to S10. Notably, another determination may be executed in S64. For example, the CPU 22 may determine YES in S64 in a case where it is determined that a change in one or more of the ink remaining amounts is equal to or larger than a threshold.

On the other hand, in a case of determining that at least one of the remaining amounts of the four colors of ink is equal to or less than the threshold (YES in S64), in S66, the CPU 22 executes a process for arranging shipping of the color ink the remaining amount of which is equal to or less than the threshold. Specifically, the CPU 22 firstly identifies, from the registration table 30, the user number associated with the device information including the serial number which was received in S60, and subsequently identifies, from the user information table 28, the address information included in the user information associated with the user number. The CPU 22 further identifies, from the registration table 30, the model name associated with the serial number which was received in S60, and identifies a kind of ink cartridge used in the printer having the identified model name. Then, the CPU 22 executes the process for arranging the shipping of the identified ink cartridge to the street address included in the identified address information. The CPU 22 further sends, to the email address included in the identified address information, an email indicating that the shipping is completed. When S66 ends, the CPU 22 returns to S10.

Figure 3:
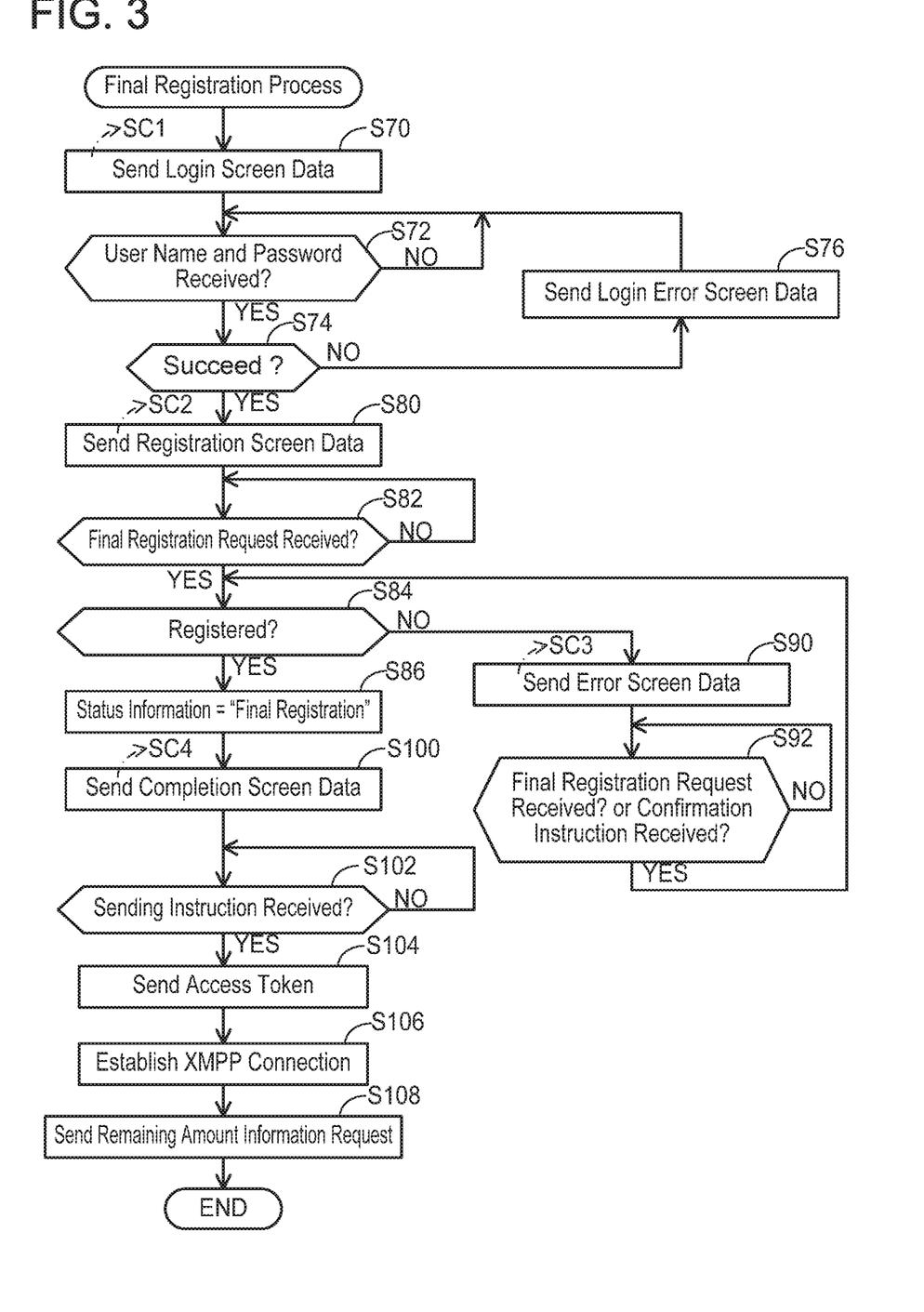
FIG. 3 shows a flowchart of a final registration process.

(Final Registration Process: FIG. 3)

Referring to FIG. 3, the final registration process executed in S50 of FIG. 2 will be described. In S70, the CPU 22 sends login screen data to the terminal device (e.g., the terminal device 400). Due to this, in the terminal device, a login screen SC1 (see FIG. 4) represented by the login screen data is displayed. The login screen SC1 includes an input field for input a user name and a password. In a case of accepting an operation of selecting (e.g., clicking) an OK button after a user name and a password have been inputted in the input field, the terminal device sends the user name and the password to the server 10.

In S72, the CPU 22 monitors receiving the user name and the password from the terminal device. In a case of receiving the user name and the password (YES in S72), in S74, the CPU 22 executes an authentication of the received user name and password. In a case where a combination of the received user name and password is registered in the user information table 28, the CPU 22 determines that the authentication succeeded (YES in S74) and proceeds to S80.

On the other hand, in a case where the combination is not registered in the user information table 28, the CPU 22 determines that the authentication failed (NO in S 74), and in S76, sends login error screen data to the terminal device. Due to this, a screen represented by the login error screen data (i.e., screen indicating the failure of login) is displayed in the terminal device, and then the login screen SC1 is displayed again. When S76 ends, the CPU 22 returns to S72.

In S80, the CPU 22 sends registration screen data to the terminal device. Due to this, a registration screen SC2 (see FIG. 4) represented by the registration screen data is displayed in the terminal device. The registration screen SC2 includes an input field for entering a registration code. In a case of accepting an operation of selecting an OK button after a registration code has been inputted in the input field, the terminal device sends a final registration request including the registration code (referred to as "target registration code" below) to the server 10.

In S82, the CPU 22 monitors receiving the final registration request from the terminal device. In a case of receiving the final registration request (YES in S82), in S84, the CPU 22 determines whether or not a registration code that matches the target registration code included in the final registration request is registered in the registration table 30. In a case of determining that the registration code is registered (YES in S84), the CPU 22 proceeds to S86, while in a case of determining that the registration code is not registered (NO in S84), the CPU 22 proceeds to S90.

In S86, in the registration table 30, the CPU 22 changes status information associated with device information including the target registration code (referred to as "target device information" below) from the interim registration status to the final registration status. Further, the CPU 22 identifies, from the user information table 28, a user number associated with the user information the authentication of which succeeded in S74. Then, the CPU 22 registers the identified user number in association with the target device information in the registration table 30. Due to this, the user information is associated with the target device information.

Next, in S100, the CPU 22 sends completion screen data to the terminal device. Due to this, a completion screen SC4 (see FIG. 4) represented by the completion screen data is displayed in the terminal device. The completion screen SC4 includes a message indicating that a final registration of the printer has been completed. The completion screen SC4 further includes an operation instruction IS4 for encouraging the user to perform a registration confirmation operation on an operation panel of the printer (e.g., the printer 200). The registration confirmation operation is an operation for causing the printer to send a sending instruction to the server 10. The sending instruction is an instruction for causing the server 10 to send an access token.

In S102, the CPU 22 monitors receiving the sending instruction from the printer. In a case of receiving a sending instruction including the serial number of the printer (YES in S102), in S104, the CPU 22 creates an access token and sends the created access token to the printer. Further, the CPU 22 identifies the target device information including the serial number included in the sending instruction from the registration table 30, and registers, in the registration table 30, the created access token in association with the identified target device information. Notably, in a variation, the access token may be created before the determination of YES in S102, and may be registered in association with the target device information in the registration table 30.

In S106, the CPU 22 establishes the XMPP connection with the printer. Specifically, in a case of receiving a connection request including an access token from the printer, the CPU 22 determines whether or not the access token is registered in the registration table 30. Then, in a case of determining that the access token is registered, the CPU 22 sends a connection response for the connection request to the printer. As a result, the XMPP connection is established between the server 10 and the printer, which enables the server 10 to send a request to the printer. Notably, in a case of determining that the access token is not registered, the CPU 22 sends an error response for the connection request to the printer. In this case, the XMPP connection is not established.

In S108, the CPU 22 sends a remaining amount information request to the printer by using the XMPP connection established in S106. The remaining amount information request is a command for requesting the printer to periodically send the remaining amount information. Due to this, the server 10 can receive the remaining amount information from the printer (YES in S60 of FIG. 2). When S108 ends, the final registration process ends.

Notably, the CPU 22 can send a remaining amount information request again to the printer after having sent the remaining amount information request to the printer in S108. The remaining amount information request includes interval information indicating a time interval (e.g., 1 day), color information indicating a color of ink (e.g., all colors, or specific color(s)), etc. The printer periodically sends, at the time interval indicated by the interval information (e.g., every day), the remaining amount information indicating remaining amount(s) of the color(s) of ink as indicated by the color information. Here, the interval information and the color information can be changed by an administrator of the server 10. In a case where at least one of the pieces of information is changed after the remaining amount information request was sent in S108, the CPU 22 sends a remaining amount information request including the changed pieces of information again to the printer by using the XMPP connection established in S106. That is, the server 10 can send, by using the XMPP connection, the remaining amount information request to the printer again without receiving a request from the printer.

Further, in the case of determination of NO in S84, in S90, the CPU 22 sends error screen data to the terminal device. Due to this, an error screen SC3 (see FIG. 4) represented by the error screen data is displayed at the terminal device. The error screen SC3 includes two instructions IS1 and IS2 respectively corresponding to two causes by which the determination of NO could be made in S84 resulting from an absence of registration of the target registration code in the registration table 30. One of the two causes is that the server 10 has not received the interim registration request including the target registration code from the printer (i.e., S20 to S26 of FIG. 2 have not been executed). The instruction IS1 corresponding to the one of the two causes includes a message for encouraging the user to select a button B1 after turning on the power of the printer. In a case of accepting the operation of selecting the button B1, the terminal device sends a confirmation instruction to the server 10. The confirmation instruction is an instruction for causing the server 10 to execute the determination of S84 again. Further, the other one of the two causes is that the target registration code is not correct. The instruction IS2 corresponding to the other one of the two causes includes a message for encouraging the user to input the registration code again. In a case of accepting the user operation of selecting a button B2, the terminal device displays the registration screen SC2 again. Due to this, the user can input the registration code again in the registration screen SC2. As a result, a final registration request including the registration code is sent to the server 10 again from the terminal device.

Next, in S92, the CPU 22 monitors receiving the confirmation instruction from the terminal device in response to the selection of the button B1, and receiving the final registration request from the terminal device in response to the selection of the button B2. In a case of receiving the confirmation instruction or the final registration request, the CPU 22 determines YES in S92, and returns to S84.

Figure 5:
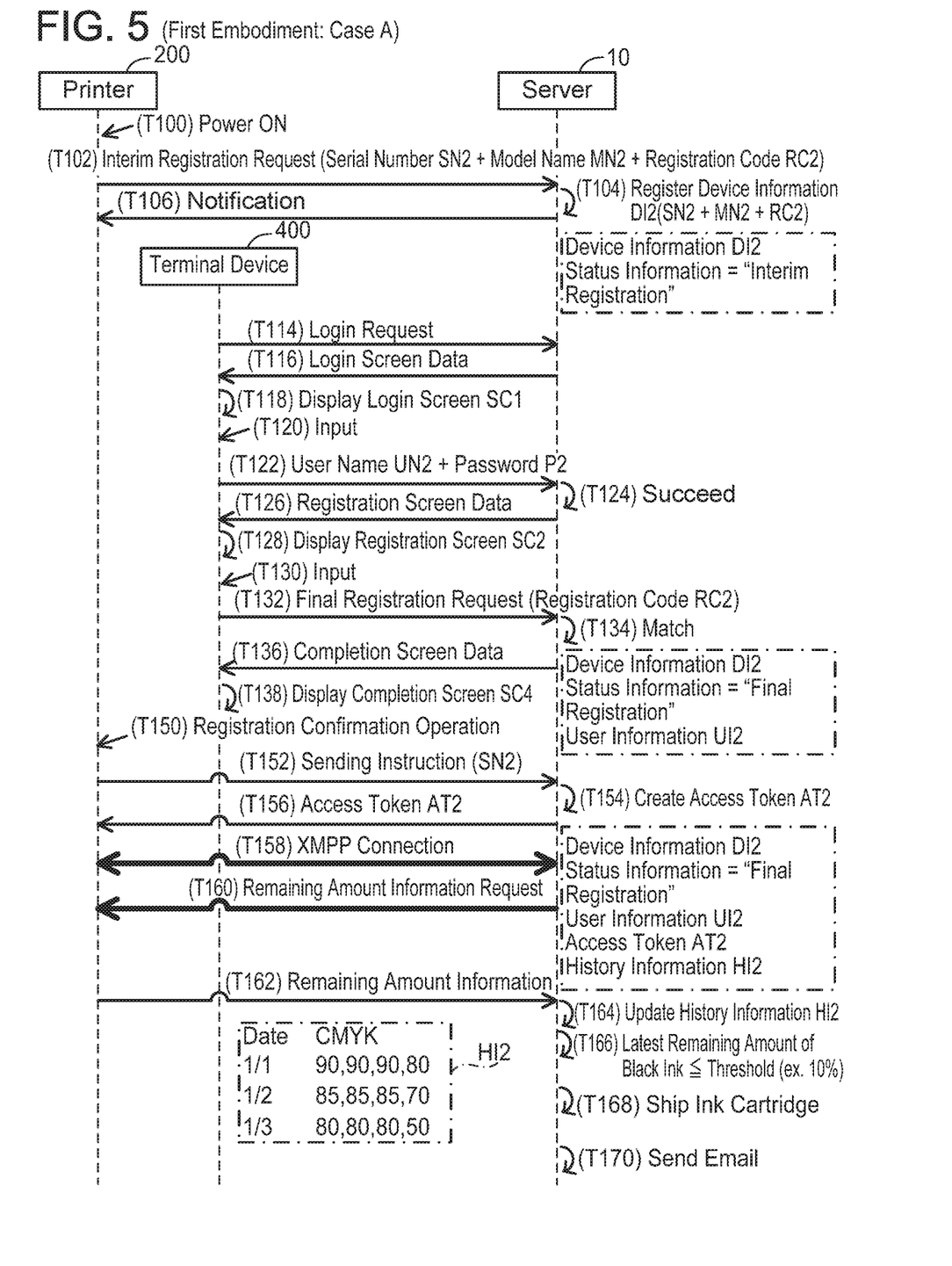
FIG. 5 shows a sequence representing a case A where device information is registered in a server.

(Exemplary Case A: FIG. 5)

Referring to FIG. 5, an exemplary case A realized by the processes of FIGS. 2 and 3 will be described. In an initial state of the present case, the printer 200 is connected to the LAN 4 and has not been turned on even once, since shipped.

In T100, the user turns on the power of the printer 200. In this case, in T102, the printer 200 sends the interim registration request including the serial number SN2, the model name MN2, and the registration code RC2 to the server 10.

When receiving the interim registration request of T102 from the printer 200 (YES in S20 of FIG. 2), in S104, the server 10 registers, in the registration table 30, device information DI2 including each information SN2, MN2, and RC2 in the interim registration request (S22). At this occasion, the status information indicating the interim registration state is associated with the device information DI2 (S24). In T106, the server 10 sends the notification indicating that the interim registration has been completed to the printer 200 (S26).

Although not shown, in a case where the user wishes to register user information UI2, the server 10 receives, from the terminal device 400, the user information UI2 inputted to the terminal device 400 by the user (YES in S10 of FIG. 2). The user information UI2 includes a user name UN2, a password P2, and address information A2. The server 10 registers the received user information UI2 in the user information table 28 (S12). The process of registering the user information UI2 is executed prior to T114.

In a case where the user wishes the final registration of the printer 200 after the user information UI2 has been registered in the server 10, in T114, the terminal device 400 sends the login request to the server 10.

In T116, when receiving the login request of T114 from the terminal device 400 (YES in S40), the server 10 sends the login screen data to the terminal device 400 (S70 of FIG. 3).

In T118, the terminal device 400 displays the login screen SC1, and in T120, accepts the operation of inputting the user name UN2 and the password P2. In this case, in T122, the terminal device 400 sends each piece of the information UN2 and P2 to the server 10.

When receiving the information UN2 and P2 of T122 from the terminal device 400 (YES in S72 of FIG. 3), in T124, the server 10 determines that the authentication succeeded (YES in S74), and in T126, sends the registration screen data to the terminal device 400 (S80).

In T128, the terminal device 400 displays the registration screen SC2, and in T130, accepts the operation of inputting the registration code RC2. In this case, in T132, the terminal device 400 sends the final registration request including the registration code RC2 to the server 10.

When receiving the final registration request of T132 from the terminal device 400 (YES in S82), in T134, the server 10 determines that a registration code which matches the registration code RC2 included in the final registration request is registered in the registration table 30 (YES in S84). In this case, the server 10 changes the status information associated with the device information DI2 including the registration code RC2 from the interim registration state to the final registration state (S86), and associates the user information UI2 with the device information DI2 (S86). In T136, the server 10 sends the completion screen data to the terminal device 400 (S100).

In T138, the terminal device 400 displays the completion screen SC4. Due to this, in T150, the user performs the registration confirmation operation on the printer 200. In this case, in T152, the printer 200 sends the sending instruction including the serial number SN2 to the server 10.

When receiving the sending instruction of T152 from the printer 200, in T154, the server 10 creates an access token AT2 and registers the access token AT2 in association with the device information DI2 (S104). Then, in T156, the server 10 sends the access token AT2 to the printer 200 (S104). Here, the server 10 sends the access token AT2 to the printer 200 in response to the sending instruction of T152 from the printer 200. Due to this, without using the XMPP connection, the server 10 can send the access token AT2 to the printer 200 passing through a firewall of the LAN 4. As a result, in T158, by using the access token AT2, the XMPP connection is established between the server 10 and the printer 200. Notably, in FIG. 5, a communication related to the XMPP connection is shown with a bold line. Then, in T160, the server 10 sends the remaining amount information request to the printer 200 by using the established XMPP connection.

When the remaining amount information is to be sent to the server 10 after the remaining amount information request has been received, the printer 200 establishes an HTTPS connection with the server 10 by using the access token AT2. Then, in T162, the printer 200 sends the remaining amount information to the server 10 by using the established HTTPS connection. In response to receiving the remaining amount information request once, the printer 200 periodically (e.g., every day) sends the remaining amount information to the server 10.

When receiving the remaining amount information of T162 from the printer 200 (YES in S60 of FIG. 2), in T164, the server 10 updates history information HI2 by adding the remaining amount information to the history information HI2 (S62). Then, in T166, the server 10 determines that a remaining amount of black ink in the latest remaining amount information is equal to or less than the threshold of 10% (YES in S64). In this case, in T168, the server 10 executes the process for arranging the shipping of an ink cartridge of the black ink to a street address of the address information A2 included in the user information UI2 which is associated with the device information DI2 (S66). Further, in T170, the server 10 sends an email indicating that the ink cartridge has been shipped to an email address of the address information A2 (S66).

As described above, in the case of receiving the interim registration request from the printer 200, the server 10 registers in an interim manner the device information DI2 including the serial number SN2 and the registration code RC2 in the registration table 30 (T104). Then, in the case where the final registration request is received from the terminal device 400 and the registration code RC2 included in the final registration request matches the registration code RC2 in the registration table 30, the server 10 registers in a final manner the device information DI2 in the registration table 30 (T134). As described above, the registration code RC2 is stored in advance in the printer 200, without being inputted in the printer 200 by the user. Therefore, there is no need for the user to input the registration code RC2 to the printer 200 to register the device information DI2 in the server 10. Compared to an operation portion (e.g., a mouse and a keyboard) of the terminal device 400 or the like, inputting information to the operation panel of the printer 200 is burdensome. In the present embodiment, there is no need to input the registration code RC2 to the printer 200, and thus workload of the user can be reduced.

Notably, the following method can be considered as a comparative example for registering, in the final manner, the device information DI2 in the server 10 without using the registration code RC2. That is, the interim registration request of T102 does not include the registration code RC2, and the device information DI2 which is registered in the interim manner in T104 does not include the registration code RC2 either. Then, in T130, the user inputs the serial number SN2 of the printer 200 to the terminal device 400, as a result of which, in T132, the final registration request including the serial number SN2 is sent to the server 10 from the terminal device 400. In this case, the server 10 determines whether or not the serial number SN2 is registered in the registration table 30, and in a case of determining that the serial number is registered, the server 10 changes the registration state of the device information DI2 from the interim registration state to the final registration state. In this regard, as aforementioned, the number of letters constituting the serial number SN2 is greater than the number of letters constituting the registration code RC2. Therefore, it is burdensome for the user to input the serial number SN2 to the terminal device 400. Contrary to this, in the present embodiment, since the user simply needs to input the registration code RC2 which includes the relatively small number of letters to the terminal device 400, workload of the user can be reduced. Further, the serial number SN2 includes a number given serially, and thus the serial number SN2 is easily presumed by a third party who is different from the valid user of the printer. Due to this, in the aforementioned comparative example, the device information DI2 can be registered in the final manner in the server 10 by the third party. Contrary to this, since the registration code RC2 is a randomly-set character string, the registration code RC2 is difficult to be presumed by the third party. Due to this, by using the registration code RC2 as described in the present embodiment, the final registration of the device information DI2 by the third party can be prevented.

Further, in the case of registering the device information DI2 in the final manner in the registration table 30, the server 10 sends the completion screen data which represents the completion screen SC4 including the operation instruction IS4 to the terminal device 400 (T136), and thus the server 10 can cause the user to appropriately perform the registration confirmation operation (T150) to the printer 200. Due to this, the server 10 can register the device information DI2 in the final manner, and after having received the sending instruction from the printer 200 (T152), the server 10 executes the service appropriately. Especially, since the user information UI2 is associated with the device information DI2 in the final registration state, the server 10 can appropriately provide the service to the user according to the user information UI2 (T168, T170).

Further, in the case of registering the device information DI2 in the interim manner, the server 10 registers the access token AT2 in association with the device information DI2 (T154), and sends the access token AT2 to the printer 200 (T156), as a result of which the server 10 can establish the XMPP connection with the printer 200 (T158) by using the access token AT2. Due to this, the server 10 can send the remaining amount information request to the printer 200 by using the XMPP connection, as a result of which the server 10 can appropriately receive the remaining amount information from the printer 200.

Figure 6:
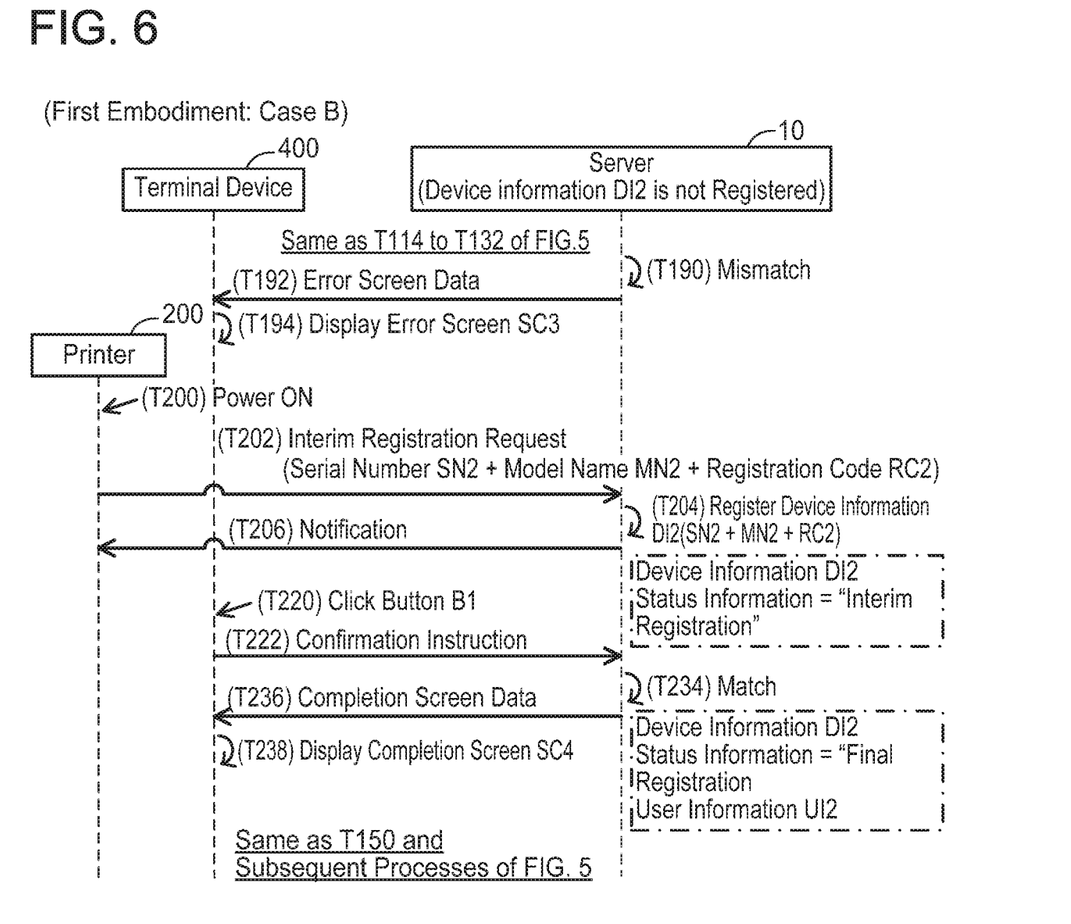
FIG. 6 shows a sequence representing a case B where registration codes do not match each other.

(Exemplary Case B: FIG. 6)

Referring to FIG. 6, another exemplary case B will be described. An initial state of the printer 200 in the present case is the same as that of the case A in FIG. 5. That is, the printer 200 has not been turned on even once.

In the present case, before receiving the interim registration request including the registration code, the server 10 receives the final registration request including the registration code. That is, in the registration table 30 of the server 10, the device information DI2 is not registered yet when the server 10 receives the final registration request.

In the case B, without processes same as T100 to T106 of FIG. 5 being executed, processes same as T114 to T132 of FIG. 5 are executed. Next, in T190, since the device information DI2 is not registered in the registration table 30, the server 10 determines that the registration code which matches the registration code RC2 included in the final registration request of T132 is not registered in the registration table 30 (NO in S84 of FIG. 3). In this case, in T192, the server 10 sends the error screen data to the terminal device 400 (S90).

In T194, the terminal device 400 displays the error screen SC3. In this case, the user sees the instruction IS1 of the error screen SC3, and then performs an operation of turning on the power of the printer 200. This allows the user to appropriately perform an operation for causing the printer 200 to send the interim registration request. That is, in T200, the user performs the operation of turning on the power of the printer 200. As a result, in T202, the printer 200 sends the interim registration request to the server 10. The subsequent T204 and T206 are respectively the same as T104 and T106 of FIG. 5. In T220, after having turned on the power of the printer 200, the user selects the button B1 of the error screen SC3. In this case, in T222, the terminal device 400 sends the confirmation instruction to the server 10.

When the server 10 receives the confirmation instruction of T222 from the terminal device 400 (YES in S92 of FIG. 3), since the device information DI2 is registered in the registration table 30 (T204), in T234, the server 10 determines that the registration code which matches the registration code RC2 received in T132 of FIG. 5 is registered in the registration table 30 (YES in S84). The subsequent T236 and T238 are respectively the same as T136 and T138 of FIG. 5. Afterwards, T150 and the subsequent processes of FIG. 5 are executed.

As shown in the case B, in the case where the determination that the registration code RC2 is not registered is made in T190, the user can perform, by seeing the error screen SC3, the operation of turning on the power of the printer 200 (T200) and select the button B1 of the error screen SC3 (T220). As a result, the user can register the device information DI2 in the final manner without inputting the registration code RC2 again to the terminal device 400. Due to this, workload of the user can be reduced.

Figure 7:
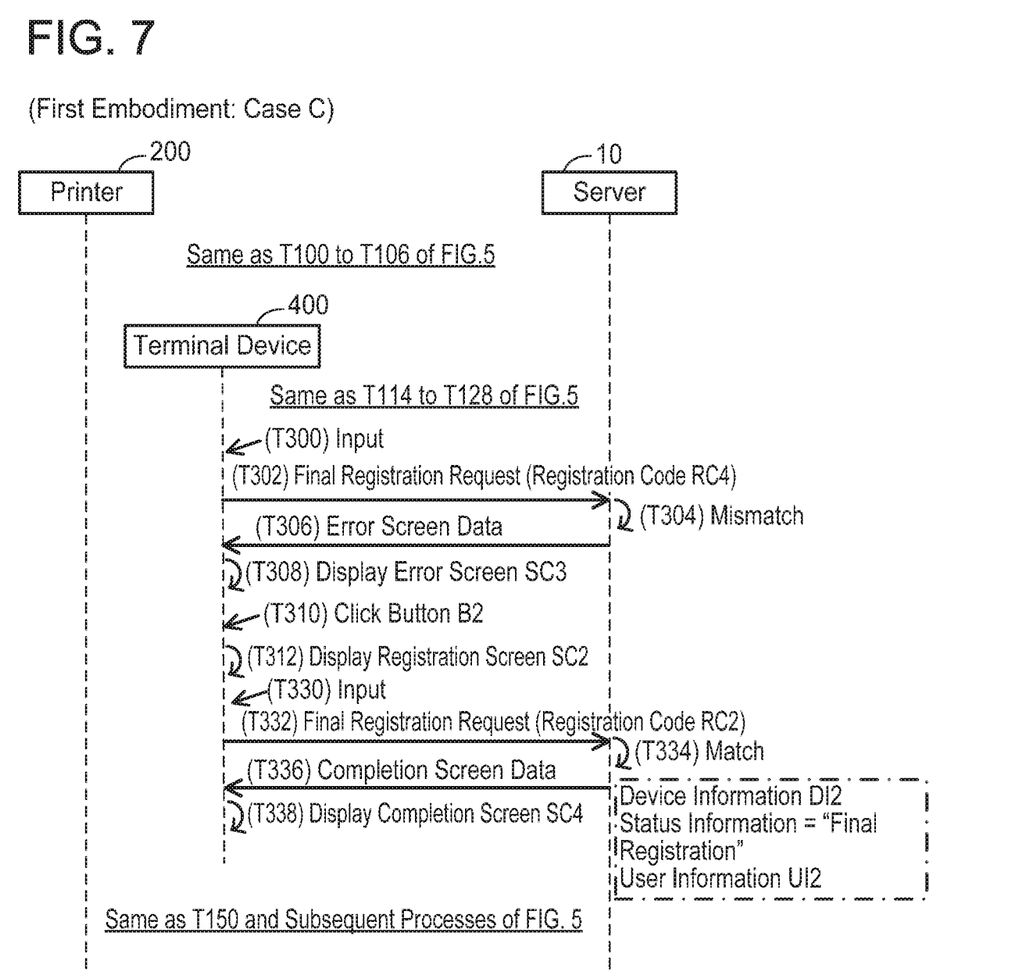
FIG. 7 shows a sequence representing a case C where registration codes do not match each other.

(Exemplary Case C: FIG. 7)

Referring to FIG. 7, another exemplary case C will be described. An initial state of the printer 200 in the present case is the same as that of the case A of FIG. 5. In the case C, processes same as T100 to T106 of FIG. 5 are executed, and then processes same as T114 to T128 of FIG. 5 are executed.

In T300, the terminal device 400 accepts an operation of inputting a registration code RC4 which is different from the correct registration code RC2. In this case, in T302, the terminal device 400 sends a final registration request including the registration code RC4 to the server 10.

In a case of receiving the final registration request of T302 (YES in S82 of FIG. 3), in T304, the server 10 determines that a registration code which matches the registration code RC4 is not registered in the registration table 30 (NO in S84). The subsequent T306 and T308 are respectively the same as T192 and T194 of FIG. 6. In this case, in T310, the user sees the instruction IS2 of the error screen SC3 and selects the button B2. In this case, in T312, the terminal device 400 displays the registration screen SC2, and in T330, accepts the operation of inputting the registration code RC2. Then, in T332, the terminal device 400 sends the final registration request including the registration code RC2 to the server 10. T334 to T338 are respectively the same as T134 to T138 of FIG. 5. Afterwards, T150 and the subsequent processes of FIG. 5 are executed.

As shown in the case C, in the case where the determination that the registration code RC4 is not registered is made in T304, by seeing the error screen SC3, the user can input the correct registration code RC2 to the terminal device 400 (T330). Due to this, the user can register the device information DI2 in the final manner appropriately.

(Correspondence Relationships)

Figure 4:
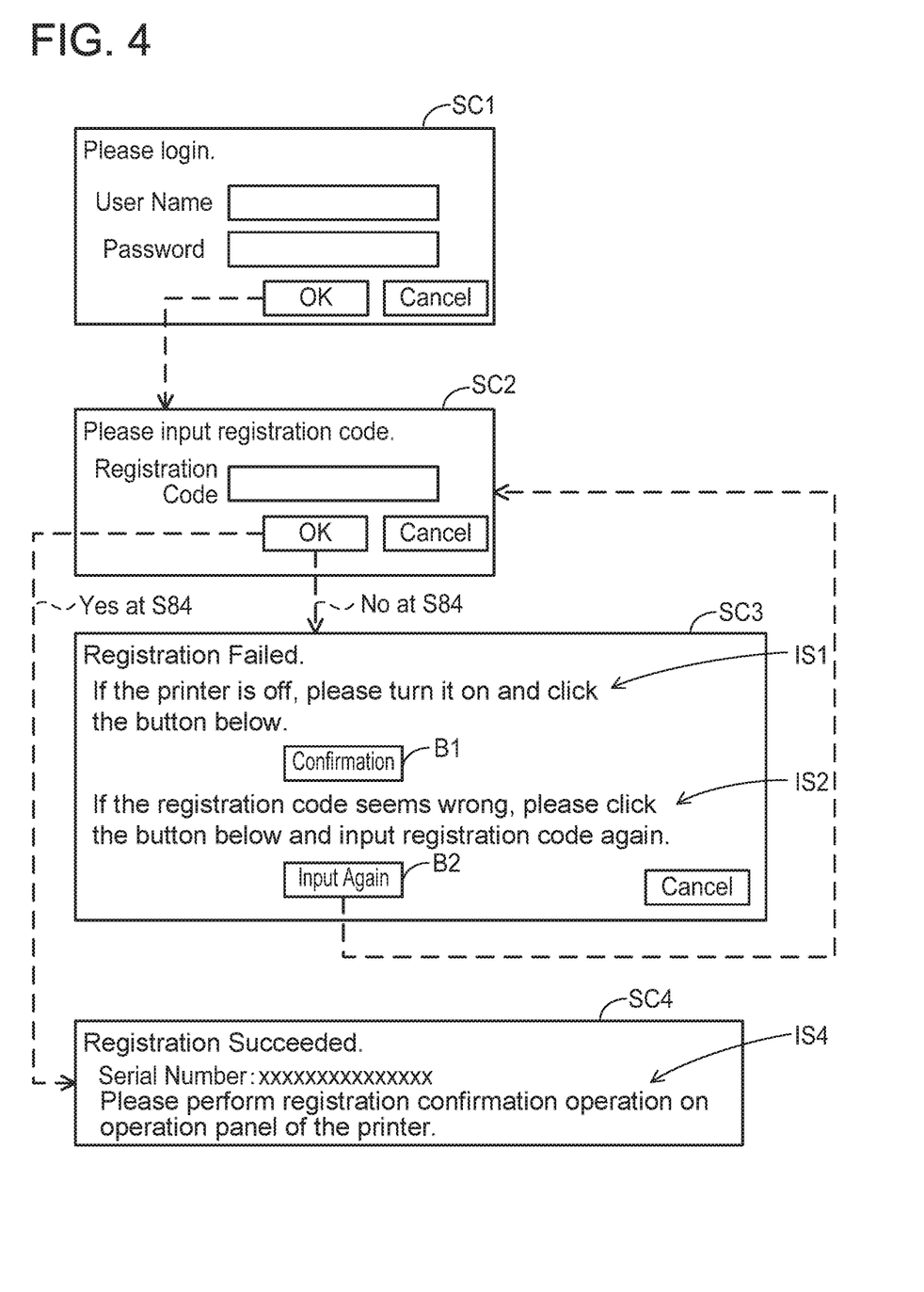
FIG. 4 shows screens displayed in a terminal device.

The printer 100 is an example of "communication device". The serial number SN2 and the model name MN2 are examples of "identification information". The device information DI2 is an example of "target information". The interim registration request and the registration code RC2 of T102 of FIG. 5 are respectively examples of "first registration request (one of first and second registration requests)" and "first code (one code)". The final registration request and the registration code RC2 of T132 are respectively examples of "second registration request (the other one of first and second registration requests)" and "second code (the other code)". The interim registration state and the final registration state are respectively examples of "first registration state" and "second registration state". The shipping of ink of T168 and the sending of the email of T170 are examples of "target service". The access token AT2 is an example of "connection information". At least one of the XMPP connection and the HTTPS connection is an example of "connection". The remaining amount information request of T160 and the remaining amount information are respectively examples of "information request" and "device-related information". The registration confirmation operation of T150 and the sending instruction of T152 are respectively examples of "first predetermined operation" and "related instruction". The completion screen SC4, the error screen SC3 including the instruction IS1, and the error screen SC3 including the instruction IS2 of FIG. 4 are respectively examples of "first screen", "second screen", and "third screen". The operation of turning on of T200 of FIG. 6 is an example of "second predetermined operation".

Second Embodiment

In the present embodiment, a registration code which has been stored in advance in a printer is created from a serial number of the printer. Specifically, when manufacturing the printer, a vender of the printer creates the registration code by encrypting the serial number of the printer according to a predetermined key used in a common key cryptosystem. The common key cryptosystem is a system, such as AES (abbreviation of Advanced Encryption Standard), in which encryption and decryption are executed by a same key. Notably, in a variation, the registration code may be created by encrypting the serial number of the printer according to a predetermined key used in a public key cryptosystem. The public key cryptosystem is a system in which encryption and decryption are executed by different keys.

(Service Process: FIG. 2)

In the present embodiment, a process in the case of YES in S20 of FIG. 2 is different from that of the first embodiment. In the case of YES in S20, the CPU 22 proceeds to S30.

In S30, the CPU 22 creates a specific number by decrypting the registration code included in the interim registration request by using a predetermined key. Then, in S32, the CPU 22 determines whether or not the specific number and the serial number included in the interim registration request match. In a case of determining that the specific number and the serial number included in the interim registration request match (YES in S32), the CPU 22 proceeds to S22, whereas in a case of determining that the specific number and the serial number included in the interim registration request do not match (NO in S32), the CPU 22 skips S22 through S26 and returns to S10.

As mentioned above, the serial number is easily presumed by a third party. Thus, the third party can unrighteously access the server 10, and register in the interim manner a presumed serial number of an actual printer and an unauthorized registration code in the server 10. Contrary to this, in the present embodiment, in the case where the specific number decrypted from the registration code included in the interim registration request and the serial number included in the interim registration request do not match, the device information is not registered in the interim manner in the registration table 30 (NO in S32 of FIG. 2). Due to this, the unrighteous registration of the device information in the server 10 by the third party can be prevented.

(Variation 1)

Even in a case where the final registration request is received before the receipt of the interim registration request, the registration code included in the final registration request may be registered in the registration table 30. For example, in the case of NO in S84 of FIG. 3, the CPU 22 may register the registration code included in the final registration request in the registration table 30. Then, in the case of YES in S20 of FIG. 2, the CPU 22 may execute the same determination as in S84 of FIG. 3; in the case of YES in S84, the CPU 22 may execute S86 and the subsequence processes of FIG. 3; and in the case of NO in S84, the CPU 22 may execute S22 and the subsequence processes of FIG. 2. In the present variation, the final registration request and the interim registration request are respectively examples of "one of first and second registration requests" and "the other of the first and second registration requests".

(Variation 2)

The device information may not be registered in association with the status information in the registration table 30. For example, the memory 24 may comprise an interim registration area and a final registration area. The CPU 22 may register the device information in the interim manner by storing the device information in the interim registration area, and may register the device information in the final manner by storing the device information in the final registration area.

(Variation 3)

The information received in S60 of FIG. 2 may not be limited to the remaining amount information. For example, the CPU 22 may receive frequency information indicating a number of times of printing in the printer. In this case, the CPU 22 may send the frequency information by email. In the present variation, the frequency information and the sending of the frequency information by email are respectively examples of "device-related information" and "target service".

(Variation 4)

The user information table 28 may not be provided. For example, the server 10 may be a server executing a service that translates text in a print target file into a predetermined language. In this case, after having registered the device information in the final manner, the CPU 22 receives a translation request including a serial number and the print target file from the terminal device, and translates the text in the print target file. Next, the CPU 22 identifies the device information from the serial number included in the translation request, and identifies a printing capability of the printer indicated by a model name included in the identified device information. Afterwards, based on the identified printing capability, the CPU 22 converts the translated file to print data and sends the print data to the printer. In the present variation, the creation and sending of the translated file is an example of "target service". Notably, in another variation, instead of the above-mentioned translation, a predetermined image processing (e.g., correction of white balance, conversion from a color image to a monochrome image, etc.) may be executed to the print target file.

(Variation 5)

Even in a case of not accepting the registration confirmation operation of T150 after having sent the interim registration request to the server 10, the printer 200 may periodically send the sending instruction to the server 10. In this case, the CPU 22 can execute S102 without executing S100 of FIG. 3. Since there is no need for the registration confirmation operation to be performed, workload of the user can be reduced. Notably, in the present variation, the printer 200 needs to send the sending instruction periodically to the server 10, and thus processing load of the printer 200 can be increased. Contrary to this, in the first and second embodiments, the printer 200 sends the sending instruction to the server 10 in response to accepting the registration confirmation operation. Due to this, processing load of the printer 200 can be reduced.

(Variation 6)

The CPU 22 may not execute S90 and S92. For example, in the case of NO in S84 in FIG. 3, the CPU 22 may send error data representing an error screen that does not include the instructions IS1 and IS2.

(Variation 7)

In S104 of FIG. 3, the CPU 22 may send an identifier used in HTTP (abbreviation of Hyper Text Transfer Protocol) Cookie to the printer, instead of sending the access token. In this case, the CPU 22 ends the final registration process of FIG. 3 without executing S106 and S108. Further, in S60, in response to receiving the identifier from the printer, the CPU 22 may establish the HTTP connection with the printer and receive the remaining amount information via the connection. In another variation, in S104, the CPU 22 may send a specific URL (abbreviation of Uniform Resource Locator) to the printer, and end the final registration process of FIG. 3 without executing S106 and S108. Further, in S60, in response to receiving, from the printer, the connection request with the URL as a destination, the CPU 22 may establish the HTTP connection with the printer, and receive the remaining amount information via the connection. In the present variation, the identifier or the specific URL is an example of "connection information".

(Variation 8)

Instead of S30 of FIG. 2 in the second embodiment, the CPU 22 may create a specific code by encrypting the serial number included in the interim registration request by using a predetermined key. In this case, in S32, the CPU 22 may determine whether or not the created specific code and the registration code included in the interim registration request match.

(Variation 9)

"Communication device" may not be limited to a printer, and may be a scanner, a multifunction device, a facsimile machine, or the like. For example, in a case where the "communication device" is a scanner, the server 10 receives frequency information indicating a number of times of scan from the scanner and sends the frequency information by email, which is an example of "target service".

What is claimed is:

1. A non-transitory computer-readable medium storing computer-readable instructions for a server,
the computer-readable instructions, when executed by a processor of the server, causing the server to execute:
receiving a first registration request including identification information for identifying a communication device and a first code from the communication device via the Internet, the first code having been stored in advance in the communication device without being inputted into the communication device by a user of the communication device;
in a case where a second code is inputted into a terminal device different from the communication device by the user, receiving a second registration request including the second code from the terminal device via the Internet;
in a case where the first registration request is received, registering target information including the first code included in the first registration request in a memory such that a registration state of the target information is to be a first registration state, the first registration state being a state where the server does not perform a target service which is related to the communication device;
in a case where the second registration request is received after the target information has been registered in the memory, determining whether the second code included in the second registration request matches the first code included in the target information;
in a case where the server determines that the second code matches the first code, changing the registration state of the target information from the first registration state to a second registration state, the second registration state being a state where the server performs the target service which is related to the communication device identified by the identification information included in the target information, wherein in a case where the server determines that the second code does not match the first code, the registration state of the target information is not changed from the first registration state to the second registration state;
in a case where the server determines that the second code matches the first code, sending, to the terminal device, first screen data representing a first screen for encouraging the user to perform a first predetermined operation on the communication device, the first predetermined operation being for causing the communication device to send a related instruction which is related to the target service to the server; and
in a case where the registration state of the target information is changed to the second registration state, establishing a connection with the communication device;

after the connection has been established with the communication device, receiving information related to an image processing executed at the communication device; and in a case where the registration state of the target information has been changed to the second registration state and the related instruction has been received from the communication device in response to the first predetermined operation being performed on the communication device and the information related to the image processing satisfies a specific condition, performing the target service which is related to the communication device identified by the identification information included in the target information.

2. The non-transitory computer-readable medium as in claim 1, wherein
the first registration request is received when both conditions of the communication device being connected to the Internet and electrical power being supplied to the communication device are fulfilled.

3. The non-transitory computer-readable medium as in claim 1, wherein
the computer-readable instructions, when executed by the processor, cause the server to further execute:
receiving user information which is related to the user via the Internet from the terminal device; and
registering the received user information in the memory,
wherein in the first registration state, the user information is not associated with the target information,
in the second registration state, the user information is associated with the target information, and
the target service is performed by using the user information.

4. The non-transitory computer-readable medium as in claim 1, wherein the computer-readable instructions, when executed by the processor, cause the server to further execute:
in a case where the server determines that the second code does not match the first code, sending, to the terminal device, second screen data representing a second screen for encouraging the user to input a code different from the second code into the terminal device.

5. The non-transitory computer-readable medium as in claim 1, wherein the computer-readable instructions, when executed by the processor, cause the server to further execute:
in a case where the second registration request is received before the first registration request is received and before the target information is registered in the memory, sending, to the terminal device, without registering the target information including the second code in the memory, third screen data representing a third screen for encouraging the user to perform a second predetermined operation on the communication device, the second predetermined operation being for causing the communication device to send the first registration request to the server.

6. The non-transitory computer-readable medium as in claim 1, wherein
the computer-readable instructions, when executed by the processor, cause the server to further execute:
in a case where the registration state of the target information is changed from the first registration state to the second registration state, registering, in association with the target information, connection information for establishing the connection; and
sending the connection information to the communication device,
wherein the connection is established by using the connection information after the connection information has been sent to the communication device.

7. The non-transitory computer-readable medium as in claim 6, wherein
the computer-readable instructions, when executed by the processor, cause the server to further execute:
sending, to the communication device by using the established connection, an information request for requesting the information related to the image processing.

8. The non-transitory computer-readable medium as in claim 1, wherein
the computer-readable instructions, when executed by the processor, cause the server to further execute:
in a case where the first registration request is received, determining, by using the identification information and the first code, whether the first code is a code which has been created from the identification information,
wherein in a case where the server determines the first code is the code which has been created from the identification information, the determining of whether the second code matches the first code is executed, and
in a case where the server determines the first code is not the code which has been created from the identification information, the determining of whether the second code matches the first code is not executed.

9. The non-transitory computer-readable medium as in claim 1 wherein
the computer-readable instructions, when executed by a processor of the server, causes the server to further execute:
in a case where the second registration request is received before the first registration request is received, registering the target information including the second code included in the second registration request in the memory such that a registration state of the target information is to be the first registration state;
in a case where the first registration request is received after the target information has been registered in the memory, determining whether the first code included in the first registration request matches the second code included in the target information;
in a case where the server determines that the first code matches the second code, changing the registration state of the target information from the first registration state to a second registration state, wherein in a case where the server determines that the first code does not match the second code, the registration state of the target information is not changed from the first registration state to the second registration state.

10. The non-transitory computer-readable medium as in claim 9, wherein
the first registration request is received when both conditions of the communication device being connected to the Internet and electrical power being supplied to the communication device are fulfilled.

11. The non-transitory computer-readable medium as in claim 9, wherein
the computer-readable instructions, when executed by the processor, cause the server to further execute:
receiving user information which is related to the user via the Internet from the terminal device; and
registering the received user information in the memory,
wherein in the first registration state, the user information is not associated with the target information, in the second registration state, the user information is associated with the target information, and
the target service is performed by using the user information.

12. The non-transitory computer-readable medium as in claim 9, wherein
the computer-readable instructions, when executed by the processor, cause the server to further execute:
in a case where the registration state of the target information is changed from the first registration state to the second registration state, registering, in association with the target information, connection information for establishing the connection; and
sending the connection information to the communication device,
wherein the connection is established by using the connection information after the connection information has been sent to the communication device.

13. The non-transitory computer-readable medium as in claim 12, wherein
the computer-readable instructions, when executed by the processor, cause the server to further execute:
sending, to the communication device by using the established connection, an information request for requesting the information related to the image processing.

14. A server comprising:
a processor; and
a memory configured to store computer-readable instructions therein, the computer-readable instructions, when executed by the processor, causing the server to perform:
receiving a first registration request including identification information for identifying a communication device and a first code from the communication device via the Internet, the first code having been stored in advance in the communication device without being inputted into the communication device by a user of the communication device;
in a case where a second code is inputted into a terminal device different from the communication device by the user, receiving a second registration request including the second code from the terminal device via the Internet;
in a case where the first registration request is received, registering target information including the first code included in the first registration request in a memory such that a registration state of the target information is to be a first registration state, the first registration state being a state where the server does not perform a target service which is related to the communication device;
in a case where the second registration request is received after the target information has been registered in the memory, determining whether the second code included in the second registration request matches the first code included in the target information;
in a case where the server determines that the second code matches the first code, changing the registration state of the target information from the first registration state to a second registration state, the second registration state being a state where the server performs the target service which is related to the communication device identified by the identification information included in the target information, wherein in a case where the server determines that the second code does not match the first code, the registration state of the target information is not changed from the first registration state to the second registration state;

in a case where the server determines that the second code matches the first code, sending, to the terminal device, first screen data representing a first screen for encouraging the user to perform a first predetermined operation on the communication device, the first predetermined operation being for causing the communication device to send a related instruction which is related to the target service to the server; and
in a case where the registration state of the target information is changed to the second registration state, establishing a connection with the communication device;
after the connection has been established with the communication device, receiving information related to an image processing executed at the communication device; and
in a case where the registration state of the target information has been changed to the second registration state and the related instruction has been received from the communication device in response to the first predetermined operation being performed on the communication device and the information related to the image processing satisfies a specific condition, performing the target service which is related to the communication device identified by the identification information included in the target information.

15. A method performed by a server,
the method comprising:
receiving a first registration request including identification information for identifying a communication device and a first code from the communication device via the Internet, the first code having been stored in advance in the communication device without being inputted into the communication device by a user of the communication device;
in a case where a second code is inputted into a terminal device different from the communication device by the user, receiving a second registration request including the second code from the terminal device via the Internet;
in a case where the first registration request is received, registering target information including the first code included in the first registration request in a memory such that a registration state of the target information is to be a first registration state, the first registration state being a state where the server does not perform a target service which is related to the communication device;
in a case where the second registration request is received after the target information has been registered in the memory, determining whether the second code included in the second registration request matches the first code included in the target information;
in a case where the server determines that the second code matches the first code, changing the registration state of the target information from the first registration state to a second registration state, the second registration state being a state where the server performs the target service which is related to the communication device identified by the identification information included in the target information, wherein in a case where the server determines that the second code does not match the first code, the registration state of the target information is not changed from the first registration state to the second registration state;
in a case where the server determines that the second code matches the first code, sending, to the terminal device, first screen data representing a first screen for encouraging the user to perform a first predetermined operation on the communication device, the first predetermined operation being for causing the communication device to send a related instruction which is related to the target service to the server; and in a case where the registration state of the target information is changed to the second registration state, establishing a connection with the communication device;

after the connection has been established with the communication device, receiving information related to an image processing executed at the communication device; and in a case the registration state of the target information has been changed to the second registration state and the related instruction has been received from the communication device in response to the first predetermined operation being performed on the communication device and where the information related to the image processing satisfies a specific condition, performing the target service which is related to the communication device identified by the identification information included in the target information.

* * * * *